March 23, 1937.　　G. G. MORENO　　2,074,413
COLOR CINEMATOGRAPHY
Filed Sept. 1, 1934　　3 Sheets-Sheet 1
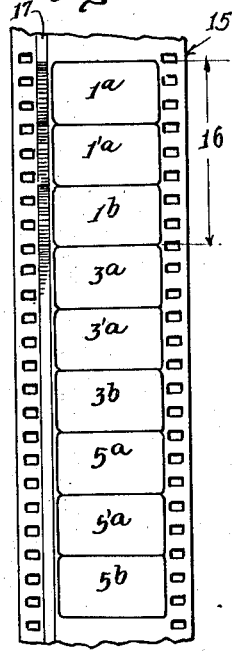
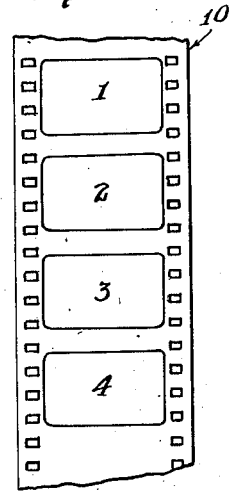
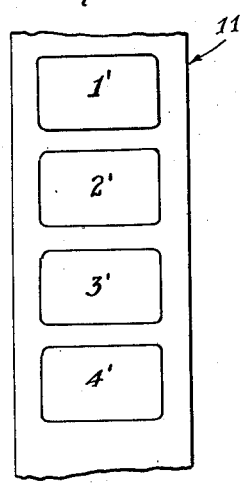
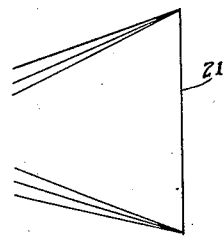
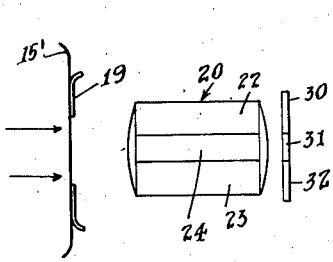
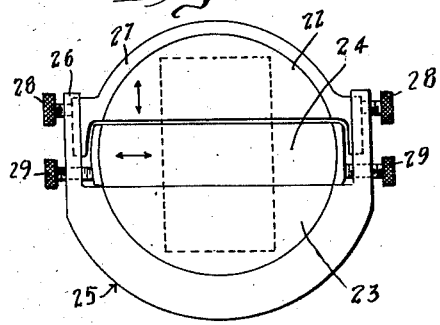
Inventor
Gabriel Garcia Moreno
By Lyon & Lyon
Attorneys March 23, 1937.　　　G. G. MORENO　　　2,074,413
COLOR CINEMATOGRAPHY
Filed Sept. 1, 1934　　　3 Sheets-Sheet 2
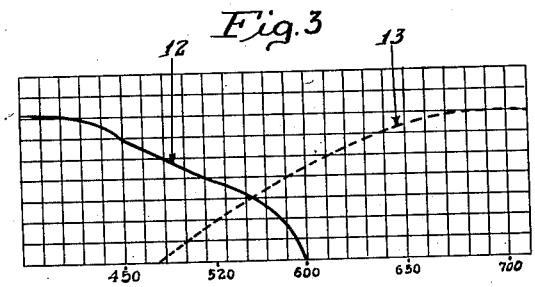
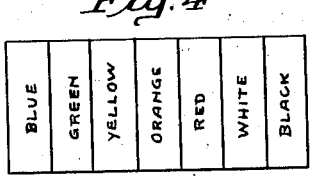
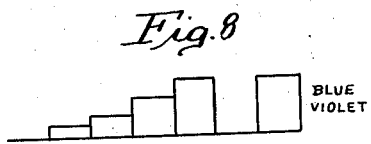
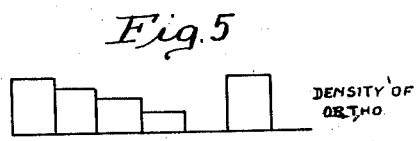
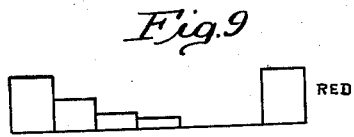
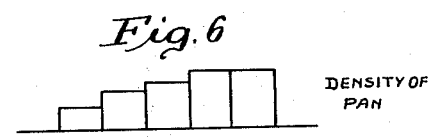
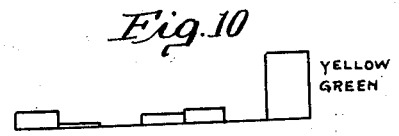
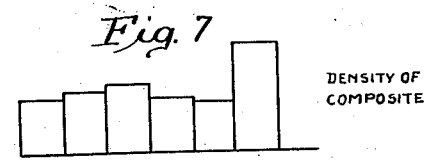
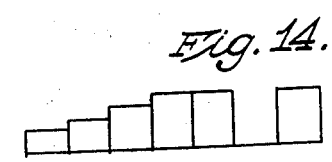
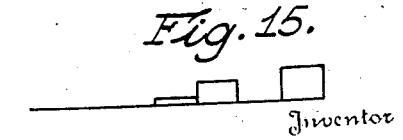
Inventor
Gabriel Garcia Moreno
By Lyon+Lyon
Attorneys Patented Mar. 23, 1937

2,074,413

UNITED STATES PATENT OFFICE 2,074,413

COLOR CINEMATOGRAPHY

Gabriel Garcia Moreno, Los Angeles, Calif., assignor to C M C Corporation, New York, N. Y., a corporation of Delaware Application September 1, 1934, Serial No. 742,398

11 Claims. (Cl. 88—16.4)

This invention relates to a method and means for photographing objects for the purpose of reproducing the same by projection in substantially natural colors. The invention also relates to means and methods whereby three primary colors may be reproduced jointly with numerous intermediate and additive colors during the projection of cinematographic film to obtain a realistic and natural reproduction of the original subjects photographed.

The method of this invention generally refers to what is known as the additive process in which during projection two or more positive transparencies are simultaneously projected upon an observation screen, each projected image passing through a suitably colored filter so that the superimposed images create the effect of the colors of the filters and additional colors formed by the blended shades or tones of the primary colors or filter colors. Instead of simultaneously projecting the positive transparencies through color filters and superimposing the same upon the observation screen, a similar effect may be obtained by projecting the transparencies in rapid succession. The images projected to form one completed image upon the observation screen are preferably isomorphous but distinguish from each other in that they represent complementary color values or color values of different portions of the spectrum.

Although two-color additive processes have been disclosed heretofore (in which an orange and a blue-green filter are used), the projected images lack fidelity. Three-color systems heretofore disclosed necessitated the use of three separately taken or simultaneously taken but distinct negatives during photography and difficulty has been experienced in producing three isomorphous images at the same time and in simultaneously projecting the same upon an observation surface.

It is practically impossible, for example, to cement three separate transparencies together so that absolute registry is obtained between the three images. It is also commercially impossible to print images from three separate films upon a single film in such manner that the images occupy identic positions on the film.

The method of this invention distinguishes from prior methods in that the effect of three-color photography is obtained by the use of but two original negatives, thereby greatly simplifying photography. Furthermore, the method greatly simplifies projection in that a single master negative is obtained bearing three isomorphous images, the final positive films being simple prints of such master negative. The length of the finished film, suitable for projection purposes, is identical to the length of the negative used during photography. No changes need be made in cameras used in photographing the objects and but a simple change need be made in the standard projection equipment for the purpose of adapting the same to the projection of three-color representations described herein.

In brief, the method of this invention contemplates the photography of objects upon two separate negatives simultaneously, the emulsions of the two negatives being preferably in contact. The emulsions of the two negatives should be differentially sensitive to the spectrum, one of them being preferentially sensitive to the short wave lengths whereas the other is preferentially sensitive to the longer wave lengths. Prints are then made of each of the negatives and a third print is formed from one of the negatives alone or from a combination of the two negatives. The three prints are then utilized in forming a master negative, identic images from each of the prints being arranged in successive sequences. These isomorphous images are then simultaneously projected through three suitably selected light filters so that the superimposed projected images form a composite in which the original colors of the object are reproduced.

An object of this invention, therefore, is to disclose and provide a method whereby reproduction in three primary colors may be obtained by the use of but two original negatives.

Another object is to disclose and provide a method of three-color additive reproduction in which the final film used for projection bears isomorphous images obtained from only two original negatives.

These and other objects, uses, advantages and adaptations of the invention will become apparent to those skilled in the art from the following detailed description of a preferred mode of operation and a modification thereof, it being understood that the invention is not limited to the use of the specific materials in the particular manner described but embraces all such changes and modifications as would naturally occur to those skilled in the art.

In describing the preferred embodiments of the invention, reference will be had to the appended drawings, in which Figs. 1 and 2 represent portions of negative films bearing isomorphous images but differing from each other in the color values recorded.

Fig. 3 diagrammatically illustrates the sensitivity of the emulsions used in the negatives.

Fig. 4 diagrammatically represents a color chart.

Fig. 5 diagrammatically represents the density of different portions of the image resulting from photography of the chart shown in Fig. 4.

Fig. 6 diagrammatically represents the density of different portions of an image resulting from the photography of the chart shown in Fig. 4 upon another emulsion.

Fig. 7 diagrammatically represents the density of the combined images of Figs. 5 and 6.

Figs. 8, 9 and 10 diagrammatically represent prints obtained from the negatives represented in Figs. 5, 6 and 7 respectively.

Fig. 11 is a section of a finished film made in accordance with this invention.

Fig. 12 diagrammatically represents a form of projection lens which may be used in the projection of the film shown in Fig. 11.

Fig. 13 is a diagrammatic side view illustrating the relationship between film, lens and light filters for the simultaneous projection of three isomorphous images of different color values.

Fig. 14 is a print of the ortho negative of Fig. 5, an excess of light having been used in obtaining this print. Fig. 15 is a print of the ortho negative of Fig. 5 showing the effect of using less than standard printing light intensity.

Figure 16:
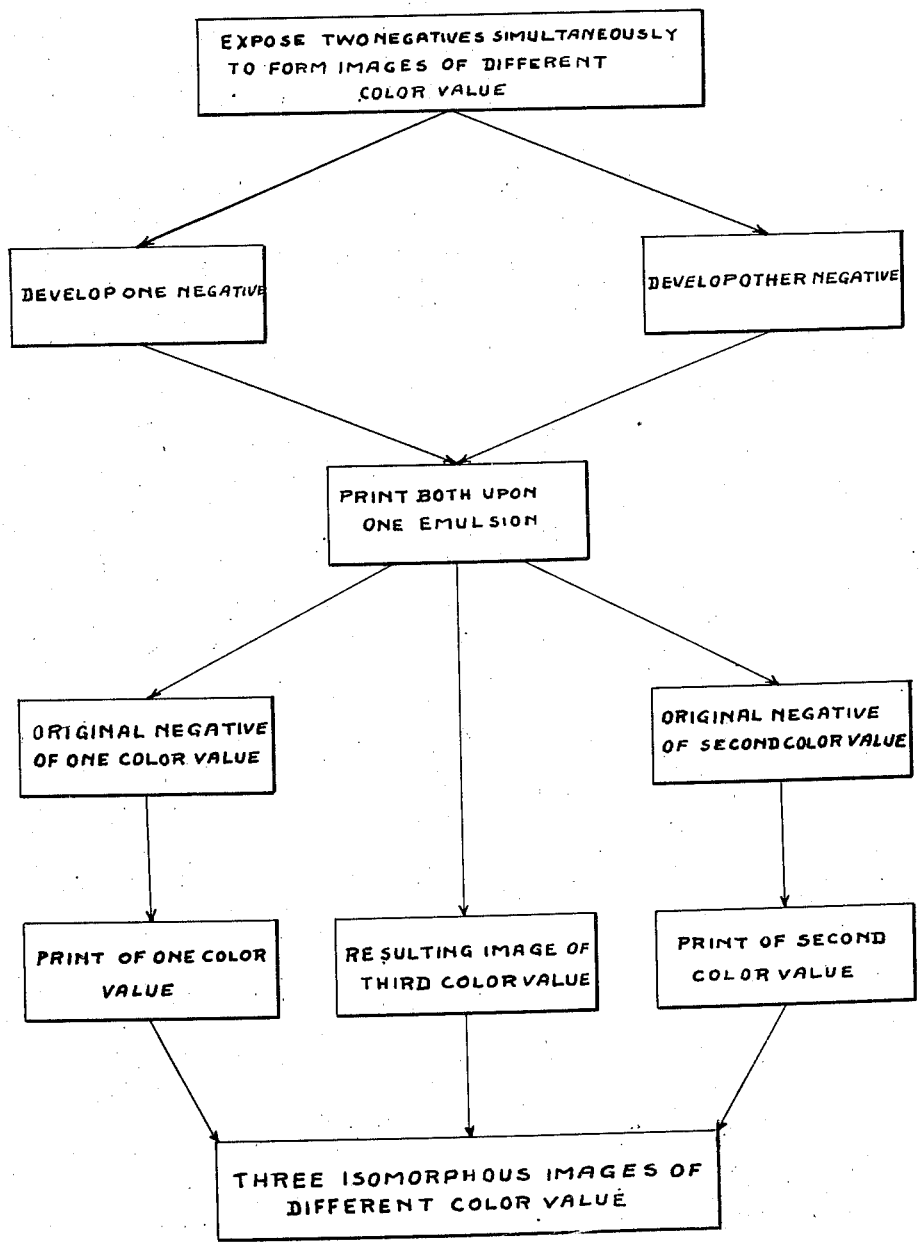
Fig. 16 is a flow chart describing the various operations carried out in obtaining the improved color process of this invention.

During photography two negative films are employed with their emulsion faces in substantial contact, or at least facing one another. The preferred film pack is of the character described in my co-pending application Serial No. 710,830 and comprises two strips of photographic film facing each other in adjacent relation, the front film, adapted to first receive light, comprising a substantially transparent emulsion carrier and a photographic emulsion preferentially sensitive to the shorter visual spectra but including the green wave lengths of about 530–540 millimicrons. The back film is preferably provided with a panchromatic emulsion which records the longer wave lengths. A red filter may either be positioned between the two emulsions or carried on the surface of one of said emulsions. If desired, however, an orthochromatic emulsion may be utilized on the front negative and a panchromatic on the rear negative. These two films are passed through the camera simultaneously, photography being accomplished by operating the camera at the standard lineal speed. Isomorphous images are thus obtained on the two films, the images differing only in color values recorded thereon.

As described in the aforesaid co-pending application, the rear film may be provided with a non-reflective backing adapted to prevent reflection of light rays and the diffusion of the image recorded in the emulsion of such rear film.

Fig. 1 represents a front negative film 10 on which the images 1, 2, 3, 4, etc., have been recorded. Fig. 2 represents the rear negative film 11 on which the isomorphous images 1', 2', 3' and 4' have been recorded. The image 1 distinguishes from the image 1' in that the blue and green colors have been preferentially recorded therein whereas the red and orange colors have been preferentially recorded in the image 1'.

The sensitivity of the emulsions carried by films 10 and 11 to light of various wave lengths is diagrammatically and approximately represented in Fig. 3. The curve 12 delineates the sensitivity of the orthochromatic type of emulsion carried by the front negative 10. It is to be noted that the emulsion is most sensitive to the short wave lengths of light, such as the blue and violet, and does not record the red. The sensitivity of the panchromatic emulsion is indicated by the curve 13 and it is to be noted that said emulsion is most sensitive to the red and orange but insensitive to the blue. Both emulsions are sensitive to light of the same wave length in the green-yellow range, that is, between about 475 and 600 millimicrons.

In the event the object to be photographed consisted of vertical bands of different colors, such as the object shown in Fig. 4, then the density of the negative image recorded upon the front emulsion carried by the film 10 would be of the order shown in Fig. 5. It is to be noted that white and blue have been recorded with substantially equal density. Red and black have not recorded at all so that the negative has high transmission at those points of the image which represent the red and black portions of the object.

The density of the panchromatic negative is diagrammatically illustrated in Fig. 6. The blue has not recorded upon this negative whereas the red has recorded with maximum density. The prints made from these negatives are diagrammatically illustrated in Figs. 8 and 9 respectively. These two prints may be used in ordinary two-color additive projection, the print shown in Fig. 8 being projected through a blue-green filter whereas the print shown in Fig. 9 could be projected through a red-orange filter.

By properly manipulating the two negatives 10 and 11, a third negative may be obtained for the purpose of producing an image which will be selectively transmissive to an intermediate color such as yellow or yellow-green. If the two negatives 10 and 11 (after development and fixing) are superimposed or placed with their emulsion sides in contact and a print is obtained from the composite, the print will have a density of the character shown in Fig. 10. It is to be noted that in view of the fact that both of the negatives are sensitive to yellow, green and orange to some extent, the density of the composite is greater for these colors than for either blue or red. In the example given, the two negatives when combined give rise to a greater density at the yellow than at any other point. As a result, the print will transmit light without any appreciable absorption in those portions of the image which correspond to the yellow of the object originally photographed. Such composite print will offer appreciable resistance to the passage of light therethrough at those points which correspond to the blue and red portions of the original object.

An examination of the three positives thus obtained (and illustrated in Figs. 8, 9 and 10) will show that the positive resulting from the orthochromatic negative will readily transmit light in the blue portions of the image. The positive resulting from the panchromatic negative will transmit light most readily in the red portions of the image. The print resulting from the combined orthochromatic and panchromatic negatives will transmit light at the yellow portions of the image in preference to other colored portions. All three positives will transmit through the white portions and all will offer maximum resistance to the passage of light representing the black portions. As a result, it is possible to project the three positives thus obtained either simultaneously or in rapid succession upon the same observation surface and thereby obtain a completed image in three primary colors and a large number of intermediate shades.

Preferably only every other consecutive image of the original negative films is utilized in producing the final positive for reproduction. In other words, instead of employing each and every image 1, 2, 3, 4, etc., recorded upon the negative 10, only images 1, 3, 5, etc., are used. The same selection is made from negative 11, the images 1', 3' and 5' being used. Images resulting from the composite of 1 and 1', 3 and 3', etc., are also employed.

At this point attention is called to the fact that when standard 35 millimeter film is used, the picture area is approximately 18.5×25 millimeters. When a sound track is to be carried by the film, the width of the image is correspondingly reduced to somewhat less than 25 millimeters. Two normal picture areas occupy about 39 millimeters of film length. In accordance with this invention, the master film bearing the triads of isomorphous images from negatives 10, 11 and the composite, are so placed upon the final or master negative or film as to occupy a length of film normally occupied by two standard picture areas. In obtaining this result, every other image of one of the consecutive series recorded upon a negative such as the negative 10, is printed upon the master film in sequential linear but spaced relation. As shown in Fig. 11, for example, the image 1 is printed as 1a, the image 3 as 3a, the image 5 is printed as 5a, etc. The corresponding isomorphous image of another series, such as the series carried by the negative 11, is printed in adjacent relation upon the master film. For example, the isomorphous image 1' from negative 11 is printed as 1'a whereas the image 3' is printed as 3'a. The isomorphous images corresponding to images 1 and 1' but differing therefrom in color value recorded and obtained as described hereinabove by a combination of the first two series (negatives 10 and 11) so as to form a third series in which portions corresponding to yellow of the object are substantially transparent, are then printed in the remaining spaces on the master film of Fig. 11. The image obtained by a combination of images 1 and 1' of negatives 10 and 11 is represented as 1b in Fig. 11, 3b representing the composite image isomorphous to images 3 and 3' obtained in a similar manner.

Attention is called to the fact that the length of film normally occupied by two standard picture areas is indicated on the master film 15 as the length 16 but that the entire triad composed of isomorphous images 1a, 1'a and 1b are carried within such length of film. This, coupled with the fact that only every other image of the original negatives 10 and 11 is applied or recorded by the master film 15, results in a master film which is of substantially the same length as each of the negative films 10 and 11.

Attention is also called to the fact that the original images, such as the images 1 and 1' obtained during photography, may extend over the entire effective width of the negative film, namely, 25 millimeters. The height of the images may be somewhat reduced, however, so as to maintain the same proportions (height to width) that will exist in the final or master film 15. The image 1a is necessarily narrower in order to accommodate the sound track 17. During the printing operation, in which the image 1 is transferred to the master film 15, it is desirable to employ optical printing, reducing the image 1 sufficiently to occupy the area 1a. This is advantageous in that although negative emulsions are generally very fine grained, the effect of graining is further reduced by the optical reduction so that an extremely sharp image of great definition is obtained on the master film 15.

It is to be understood that in producing the master film 15 a triple printing operation is carried out, a masking film or films of the character described in my co-pending application Serial No. 707,651 being preferably used. If desired, the composite images such as the images 1b, 3b, etc., may be directly printed upon the master film in the required longitudinal spacing, or a separate strip of film bearing only the composite images may be produced and then such composites printed upon the master film 15 in required order and spacing. The master film 15 may be either negative or positive, depending upon the character of the source films used. After such master film 15 has been once printed by triple exposure to the different source films, it is only necessary to employ contact printing in obtaining the release prints.

During projection, apparatus of the character illustrated in Figs. 12 and 13 may be used. The final positive to be projected is indicated at 15' as passing through a gate 19. The lens system is indicated at 20 and the observation screen or surface at 21. The triad of isomorphous images is projected simultaneously through the gate. The lens 20 may be a suitable projection lens which has been split longitudinally into two opposing segments 22 and 23 and an intermediate, substantially rectangular section 24. The segments are separated from the intermediate section by means of thin, light-absorbing, or at least non-reflective, spacing means or partitions made from thin material such as metal foil. The lens 20 is held within a suitable mount 25, the upper segment 22 being provided with means for moving the same vertically. The mount 25, for example, may be provided with upstanding edge portions 26 in which the upper segment mount 27 may be slidably positioned as by means of the thumb screws 28. The intermediate rectangular section 24 may be provided with means for moving the same in a horizontal plane and for adjustably positioning the same as by means of the thumb screws 29.

Three light filters are positioned in the projection beam as, for example, in front of the lens 20, such light filters being indicated at 30, 31 and 32. These three light filters are suitably matched so as to produce the desired effect upon the screen. In the event the negative 10 was of the orthochromatic type and the negative 11 was of the panchromatic type, then the color filters may well be of a blue-violet, red and yellow-green color respectively.

The adjustable construction of the projection lens permits absolute registration or super-imposition of the three images 1a, 1'a and 1b upon the observation screen 21. For example, in the event the images 1a, 3a, 5a, etc., are aligned with one another and with images 1b, 3b, 5b, etc., but are slightly displaced laterally of the film with respect to images 1'a, 3'a, etc., then such slight lateral displacement must be compensated for by horizontal movement of the intermediate lens section 24. In view of the fact that the projection lens may be caused to absorb any slight irregularity between the different series of isomorphous images carried by the film used for projection, it is not as essential that all three series of images carried by the master film be in perfect alignment with one another. In this manner, the greatest difficulty encountered in commercial manufacture and use of three-color projection systems is overcome.

Instead of producing the third isomorphic image by a combination printing of the two original negatives as described hereinabove, a suitable image can be obtained by regulating the intensity of the printing light during a printing operation performed upon one of the two original negatives. Fig. 5 graphically illustrates the density of the emulsion of the front film upon exposure to various colors whereas Fig. 8 illustrates the density of the resulting print when a standard printing light is used. In the event the intensity of the printing light was reduced, then obviously those portions of the print which represent the blue, green and yellow colors of the subject photographed could be rendered negligible or transparent whereas the print would be of some density in the orange portions and of considerable density in those portions of the image which corresponded to red portions of the subject, as shown in Fig. 15. This light print could then be used as the third isomorphous image of the final triad whereas a dark print of the same negative (shown in Fig. 14) could be used as the first isomorphous image of the triad. The light used in projecting the light print could then pass through a yellow-green filter whereas the light used in projecting the dark print of the same negative could be passed through a suitable blue-violet filter. The panchromatic print can be projected with a red light filter in the normal manner.

The sensitivity of the orthochromatic film to green and yellow in comparison with its sensitivity to blue would control the intensity of light used in printing and the precise transmission characteristics of the light filter used during projection of the light and dark prints of the orthochromatic negative. The last-mentioned modification makes it slightly more difficult to correctly balance the intensity of the primary colors upon the screen but furnishes another method of obtaining a three-color process from but two original negatives. It may be generally stated that the present invention is primarily concerned with the production of an image or images of a color value intermediate the color value recorded on two primary or original negatives, the precise modification of the method used in obtaining this result and the precise utilization of the resulting image or images being of secondary importance.

During projection in the manner described hereinabove, the film, such as the film 15, is intermittently advanced so as to present a different triad of images to the projection lens during each period of projection. In other words, the film is intermittently advanced a length equivalent to two normal picture areas or the length occupied by a triad of images. Although the intermittent movement of a projector may be modified in a number of different ways to produce this result, a suitable form of intermittent movement is shown in my co-pending application Serial No. 726,884, now Patent No. 2,020,564. The time consumed during projection of a triad is preferably coextensive to the sum of times consumed during the projection of two normal picture areas, when such normal picture areas are separately projected in the usual manner. During such period of projection, a shutter may interrupt the projection. The time consumed for intermittently moving the film between periods of projection should preferably be no longer than the time consumed in moving a normal film the length of but a single frame.

Although in the description given hereinabove reference has been made to specific sizes, it is to be understood that the method can be carried out with equal facility on film of a different size and with picture areas differing in proportion from those illustrated and specifically described. The selection of color or light filters, sizes, proportions, types of emulsion, etc., is left to those skilled in the art. The particular types of emulsions, shades and transmission characteristics of color filters are mentioned hereinabove simply to illustrated types which can be successfully employed. Although an adaptation of the invention to an additive process of simultaneous projection has been specifically described for purposes of facilitating understanding, the method and films or images of this invention may also be used in the additive process in which successive projection is used or in processes using dye toning, imbibition, mordanting, relief, the cementing together of separately treated films, etc. All such changes and modifications coming within the scope of the appended claims are embraced thereby.

I claim:

1. In a method of producing films for a three-color additive process, the steps of recording two consecutive series of images on two strips of film, pairs of images being recorded simultaneously, one on each film, one of said series preferentially recording the red color values, the other series of images preferentially recording the blue and green color values; printing a third series of images from the latter series with a printing light of intensity sufficient to form images in which yellow portions are substantially transparent; printing every other pair of isomorphous images from each of said three series upon a single film in sequential lineal alignment thereon to form triads, images of one color value being spaced by images of other color value, the isomorphous images of each triad occupying a length of film normally occupied by two standard size images.

2. In a method of producing films for an additive three-color process, the steps of: forming a master negative bearing a plurality of triads of isomorphous images in sequential lineal alignment thereon, each image of a triad bearing a preferential record of a different color value, by simultaneously recording pairs of images on two strips of film, the images of one film preferentially recording red color values, the images on the other film preferentially recording the blue and green color values; printing a third series of images from a combination of the first two series with printing light sufficient to form a third series in which portions corresponding to yellow of the object photographed are substantially transparent; printing every other image of one of said series in spaced sequential linear relation on a master negative; printing every other isomorphous image from another of said series in linear adjoining relation to said first printed images; and then printing every other isomorphous image from the third series upon said master negative in the remaining spaces thereon to form triads of isomorphous images of differing color value.

3. In a method of three-color cinematography, the steps of photographing an object simultaneously upon two negatives to form pairs of isomorphous images in series, the series of images on one of said negatives preferentially recording the longer visible spectra whereas the images of the series on the other negative preferentially record shorter visible spectra including the yellow-green; printing from the latter series with light sufficient to form a third series of images in which portions corresponding to yellow of the object are substantially transparent; and then simultaneously projecting isomorphous images from each of said negatives and from said print upon an observation screen, each of said images being projected through a light filter of a different color, the color of the filter used with each image substantially corresponding to the color preferentially recorded on the image.

4. In a method of three-color cinematography, the steps of photographing an object simultaneously upon two negatives to form pairs of isomorphous images in series, the series of images on one of said negatives preferentially recording the longer visible spectra whereas the images of the series on the other negative preferentially record shorter visible spectra including the yellow-green; printing from the latter series with light sufficient to form a third series of images in which portions corresponding to yellow of the object are substantially transparent; printing every other triad of isomorphous images from said negatives and separate print upon a master film in sequential lineal alignment thereon, the isomorphous images of each triad occupying a length of film normally occupied by two standard size images; and then simultaneously projecting the three isomorphous images comprising a triad upon an observation screen, each of said isomorphous images being projected through a light filter of a different color.

5. In a method of producing films for a three-color additive process, the steps of recording two consecutive series of images on two strips of film, pairs of images being recorded simultaneously, one on each film, one of said series preferentially recording the red color values, the other series of images preferentially recording the blue and green color values; printing a third series of images from the latter series with a printing light of intensity sufficient to form images in which yellow portions are substantially transparent; printing every other pair of isomorphous images from each of said three series upon a single film in sequential lineal alignment thereon to form triads, images of one color value being spaced by images of other color value, and optically reducing the images during said printing operations so as to cause isomorphous images of each triad to occupy a length of film normally occupied by two standard size images.

6. In a method of three-color cinematography, the steps of photographing an object simultaneously upon two negatives to form pairs of isomorphous images in series, the series of images on one negative preferentially recording one color value, the series of images on the other negative preferentially recording another color value, and printing every other consecutive image from said negatives, and an image derived by a controlled printing of one of said negatives, upon a master negative to form triads of isomorphous images in sequential lineal alignment thereon, each image of a triad bearing a preferential record of a different color value, the image derived by controlled printing being a preferential record of a third color value.

7. In a method of three-color cinematography, the steps of photographing an object simultaneously upon two negatives to form pairs of isomorphous images in series, the series of images on one negative preferentially recording one color value while the series of images on the other negative bear a preferential recording of another color value, printing every other consecutive image from said negatives, and an image derived by a controlled printing of every other consecutive image from one of said negatives, upon a master negative to form triads of isomorphous images in sequential lineal alignment thereon, each image of a triad bearing a preferential record of a different color value, the image derived by controlled printing being a preferential record of a third color value and then simultaneously projecting a triad of isomorphous images from said master film upon an observation screen while intermittently advancing the film a length occupied by a triad of images, each image of a triad being projected through a light filter of a different color.

8. In a method of color photography, the steps of producing two negatives of an object bearing isomorphous images, the image on one negative constituting a preferential record in one color value while the image on the other negative constitutes a record in another color value, and then printing a third image from a combination of the aforesaid negatives, said third image being of a color value intermediate the color values recorded upon said first named negatives.

9. In a method of producing photographic images of differing color value, the steps of recording a pair of images simultaneously on two films, one of said films preferentially recording the red color values, the other film preferentially recording the blue and green color values, printing a third image from said original films by a double printing operation, and controlling the light intensity used during such printing operation so as to form a third isomorphous image of a color value intermediate the color value of the two original images.

10. A cinematographic film bearing a plurality of triads of isomorphous images in sequential relation thereon, each image of a triad comprising a record of different color value than the other images of the triad, one image of each triad being a print of only every other consecutive image of a negative film bearing preferential records of longer spectra, another image of each triad being a print of only every other consecutive image of a negative film bearing preferential records of shorter spectra, and the third image of each triad preferentially recording intermediate spectra and constituting a composite print of both of said negative films.

11. A film for use in reproduction of photographs in colors comprising: a film bearing thereon a secondary image of an object, said image being obtained by a combination printing under controlled light conditions of two original isomorphous images of an object, one of said original images being a preferential record of longer spectra, the other original image being a preferential record of shorter spectra, the secondary image carried by said film being a preferential record of spectra intermediate those preferentially recorded on said original images.

GABRIEL GARCIA MORENO.